US012079096B2

(12) United States Patent
Herington et al.

(10) Patent No.: US 12,079,096 B2
(45) Date of Patent: Sep. 3, 2024

(54) DATA RESTORE TESTING

(71) Applicant: JPMorgan Chase Bank, N.A., New York, NY (US)

(72) Inventors: Daniel Herington, Frisco, TX (US); Michelle Diltz, Frisco, TX (US); Russell E. Colwell, Tampa, FL (US); Swapna Adusumilli, Irving, TX (US); David M Lin, Addison, TX (US); Taylor Madden Cherry, Justin, TX (US); Jose A. Rosado, West Windsor, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/965,480

(22) Filed: Oct. 13, 2022

(65) Prior Publication Data

US 2024/0061756 A1 Feb. 22, 2024

Related U.S. Application Data

(60) Provisional application No. 63/255,876, filed on Oct. 14, 2021.

(51) Int. Cl.
*G06F 11/14* (2006.01)
*G06F 11/26* (2006.01)

(52) U.S. Cl.
CPC .......... *G06F 11/26* (2013.01); *G06F 11/1458* (2013.01); *G06F 2201/80* (2013.01)

(58) Field of Classification Search
CPC ............................ G06F 11/1458; G06F 11/26

USPC .......................................................... 714/41
See application file for complete search history.

(56) References Cited

U.S. PATENT DOCUMENTS

| 10,942,821 B1* | 3/2021 | Potnis ................... G06F 3/0604 |
| 2016/0132684 A1* | 5/2016 | Barbas ................ G06F 21/6209 713/165 |
| 2017/0235950 A1* | 8/2017 | Gopalapura Venkatesh ................ G06F 9/4406 726/24 |
| 2017/0315877 A1* | 11/2017 | Kaplingat ........... G06F 11/1458 |
| 2018/0157521 A1* | 6/2018 | Arikatla .............. G06F 9/45558 |
| 2019/0065322 A1* | 2/2019 | Chakankar ............ G06F 16/128 |
| 2019/0305948 A1* | 10/2019 | Barbas .................. H04L 9/0891 |
| 2020/0334111 A1* | 10/2020 | Potnis ................... G06F 16/128 |
| 2021/0392132 A1* | 12/2021 | Olden ................. H04L 67/1095 |

\* cited by examiner

*Primary Examiner* — Chae M Ko
(74) *Attorney, Agent, or Firm* — Greenblum & Bernstein, P.L.C.

(57) ABSTRACT

In one example, a method of data restore testing is disclosed. The method may determine whether to validate a request to restore a backup of production data. The request may be for a database backup, a file system backup or another data type. The method may generate a database instance that restores a backup database data if the request is for database data and may generate a file system instance to restore a backup file system if the request is for a backup of a file system. The method may lockdown access to the restored backup, validate the integrity of the restored backup relative to production data. The validation may be based on a checksum of the restored backup and a checksum of the production data, for example.

19 Claims, 6 Drawing Sheets

RT Portal

Login | My Backup Restores | Restore Testing | Automated Scheduling

306 — 304 — 302

Restore and Test a Backup  308

Date of Backup  [Jan. 1, 2021] ▽
Backup Size     [20 TB] ▽
Host            [Prod_Host_1234] ▽
Location        [Luxembourg] ▽

[Submit] — 320

Repeat Testing

Questions?

DATA RESTORE TESTING

CROSS-REFERENCE TO RELATED APPLICATIONS

This application claims the benefit of domestic priority from U.S. Provisional Application No. 63/255,876, filed Oct. 14, 2021, which is hereby incorporated by reference in its entirety.

BACKGROUND

Many entities such as large companies rely on computer communication systems not only for day-to-day operations but also to scale up as the entity becomes more viable. Such computer communication systems may process and store various data including data about products, data about clients and data about future strategic initiatives, for example. However, even the most resilient computer communication system can be subject to failure. A computer system can fail and cause catastrophic data loss for any number of reasons. Such reasons may include faulty hardware or software, malicious attacks, aging or other environmentally induced conditions such as earthquakes. As such, many entities mitigate potential data loss by backing up their data. Such backups may be full or incremental and may occur nightly, weekly or at other predetermined frequencies.

BRIEF DESCRIPTION OF THE DRAWINGS

Examples of the disclosure will be rendered by reference to specific examples which are illustrated in the appended drawings. The drawings illustrate only particular examples of the disclosure and therefore are not to be considered to be limiting of their scope. The principles here are described and explained with additional specificity and detail through the use of the accompanying drawings.

DETAILED DESCRIPTION

As noted above, data backup systems may be used to mitigate data loss in computer communication systems. The backup data can be quickly restored in the event of data failure or loss. Regulatory requirements (and backup best practices) mandate the use of disaster recovery to recover backup data. Such regulatory regimes dictate the ability to test the restore of backups for all types of databases and file systems. Specifically, major regulators are mandating that entities such as financial firms verify that critical backup data can, in fact, be restored through testing.

Many large entities with diverse backup systems can find it challenging to implement restore testing. Such large entities may have backup systems that are geographically spread out across a country or even globally. Each diverse system may have its own unique underlying technology and user interface. And the services provided by such diverse systems may have inconsistent capabilities and use models. Not only do users need to interface with diverse backup (or outdated) backup systems, there can be significant duplication of effort to develop and maintain the various services.

Restore testing in many environments can also be difficult due to requirements to control and protect sensitive production data. For example, if production data is restored in a lower environment, the control requirements may be contravened. Restoring the previous night's backup on a production host is also high risk because the continued operation of the production host is threatened should the backup fail. As used herein, a production host is a server that is deployed in a "real-world" environment on which day-to-day and active applications are run.

The restoration of international backups can also be difficult. Restoring international backups to servers outside of the backup location can cause a number of issues. Such a restore scenario is inconsistent with GDPR (General Data Protection Regulation) and data sovereignty requirements. Moreover, the amount of time to restore a large database over an international WAN link is much longer relative to when both the backup and the system are in the same datacenter.

Other restoration inefficiencies in a large and diverse data network may also occur. In many such environments, users have to interact with the system every time a restore test is needed. If a restore test is needed monthly, quarterly, or at other time intervals, the requesting user has no option but to interface with the restore system.

Accordingly, examples of the present disclosure address the foregoing by providing an RT (Restore Testing) system for data restore testing. The RT system includes a single interface portal that can receive a request to restore a backup of production data for testing. Upon receipt, the portal may direct the request to a request validator module to validate the request. In one example, the portal directs the request to the request validator module via an API call.

A plurality of backup restore modules (or services) may interface with the portal. If the request to restore the backup is for database data, for example, a database restore module generates a database instance that restores the backup database data. If the request to restore the stored backup is for a file system, the file system restore module generates a file system instance to restore the stored backup file system. In other examples, the request may be to restore the backup of other data types. Before the backup is restored, the restore modules may lockdown the instance on which the backup is restored. In this manner, sensitive production data can be protected during restore testing to meet compliance requirements. The risk of restoring a backup onto a production host is also eliminated.

A restore validator module may validate the integrity of the restored backup relative to production data from which the backup is generated. In one example, the restore validator module may generate a checksum of the restored backup and a checksum of the production data, and then validates the integrity of the restored backup based on the checksum of the restored backup and the checksum of the production data. In another example, the restore validator may validate the integrity of the restored backup based on metadata of the restored backup and production data metadata.

The RT system of the present disclosure also facilitates the restoration of international backups by executing restore testing where the data backups are located. In this manner, compliance with GDPR (General Data Protection Regulation) and data sovereignty requirements are maintained. The restore testing system also includes automated scheduling of restore tests. As such, users need not interact with the system every time a restore test is needed.

Figure 1:
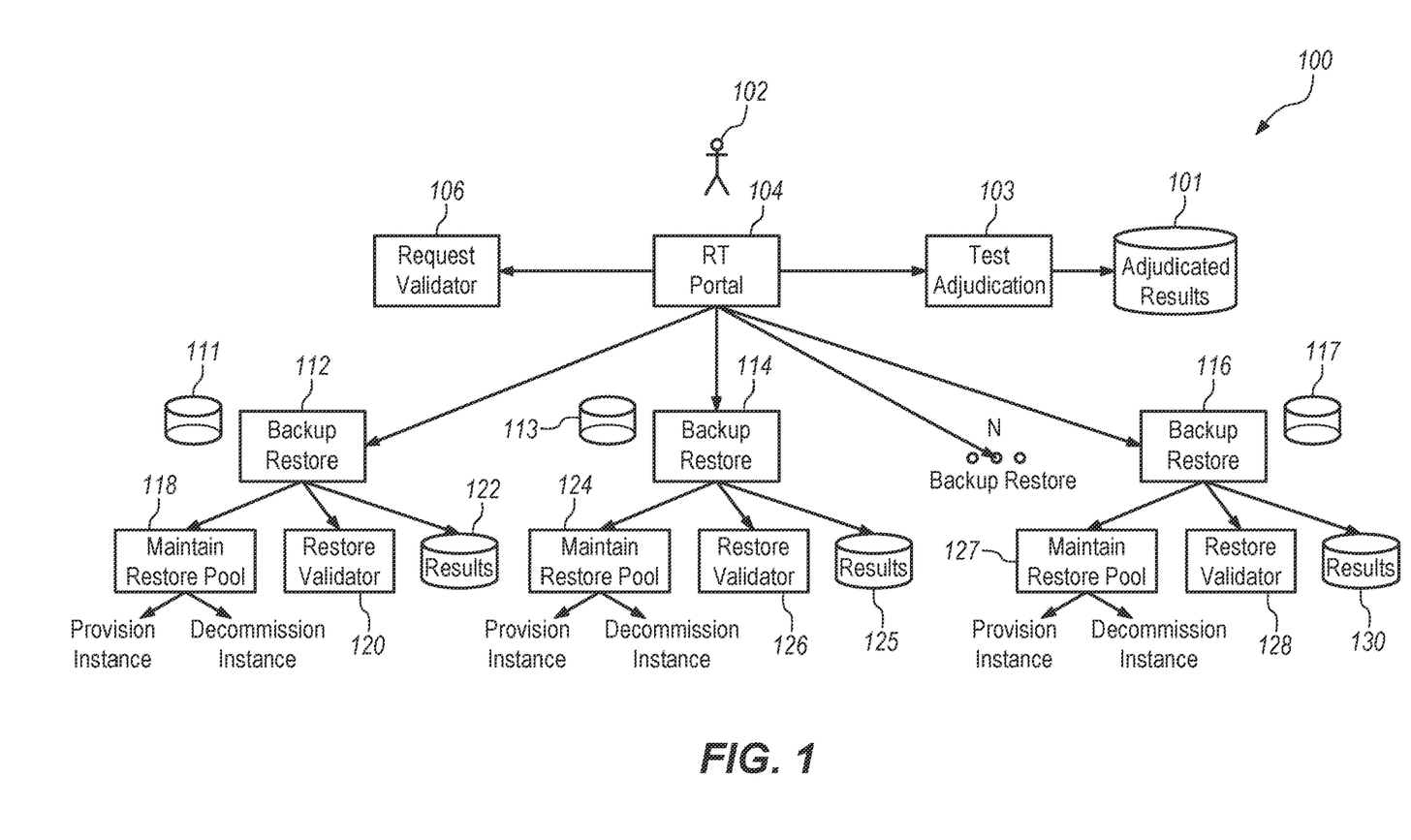
FIG. 1 illustrates an RT (Restore Testing) system according to an example of the present disclosure.

FIG. 1 illustrates a restore testing (RT) system 100 according to an example of the present disclosure.

In FIG. 1, the RT system 100 includes an RT Portal 104 communicably coupled to multiple and diverse backup restore modules/services including a backup restore 112, a backup restore 114, a backup restore 116 and a backup restore N. Backup restore N may represent additional backup restore modules and/or services. In one example implementation, the backup restores 112, 114 and 116 may have corresponding respective storage nodes 111, 113 and 117.

Here, backup restore 112 may be a dedicated Oracle module or restore service, for example. Backup restore 114 may be an SQL (Structured Query Language) module or restore service while backup restore 116 may be an FS (File System) RaaS Linux restore module or service. Other types of databases (e.g. Cassandra) may be employed.

Although not illustrated, backup restore module 112, 114, 116 may represent different modules or services for different data types. For example, backup restore 112 may represent Cohesity™ rather than an Oracle restore module. Backup restore 114 may be Rubrik™ rather than an SQL Server module and backup restore 116 may be ZDLRA™ rather than an FS RaaS Linux module.

In one implementation, each backup restore 112, 114, 116 may be associated with one or more databases that are stored in datacenters in a geographically distributed enterprise data network. The backup restore module may also be associated with Network Attached Storage (or NAS) backups, Object Storage backups, Unix or Windows File System backups, etc. See for example, FIG. 4, which illustrates plural data centers 410, 412, 414, 416, 418, 420. Here, data center 410 may be located in Luxembourg, for example. As another example, data center 412 may be located in Dallas, Texas. Further yet, data center 414 may be located in Colorado, for example.

Referring now to FIG. 1, the RT Portal 104 includes a single interface (illustrated as 300 in FIG. 3) for managing restore testing requests from inception to completion. The single interface 300 is a centralized interface from which all of the disparate backup restores 112, 114, 116 can be accessed. The single interface 300 and the RT Portal 104 are modular and tie together all of the geographically distributed backup restores 112, 114, 116. In this manner, this centralized architecture creates a more dynamic, automated, efficient and scalable backup restore module system in the geographically distributed enterprise data network.

In FIG. 1, a user 102 may utilize RT Portal 104 to log into a distributed enterprise data network (e.g. 402 of FIG. 4) and to generate a request to restore a backup for testing, where in one implementation the backup is stored on a storage node either on site or at a data center. Here, the user 102 may represent a division of a large entity. For example, if the enterprise data network is for a large entity, the user 102 may be a division of that entity. Here, restore testing may be requested by a division in order to meet specific regulatory and/or compliance regimes.

Generally, in operation and with reference to FIG. 1, the user 102 may begin by interfacing with the RT Portal 104 to generate a request to restore a backup for testing. In one example, the restore testing request may include defined attributes of the data backup, e.g., the date and time of the backup that may be specified by user 102. After generation of the restore testing request, the front-end system sends the restore testing request to a request validator module 106 for validation. In one example, the restore testing request is via an API (Application Programming Interface) call that interfaces with the request validator module.

Here, the request validator module 106 manages the approval process. That is, in one implementation, for each restore testing request that is generated, the request validator module 106 automatically provides a corresponding approval/authorization to the API. The validation may be based on a permission list as in Table 1 below, for example:

| Manager Authorization List | | |
|---|---|---|
| User John Doe | Permissions | Service Instances:<br>Backup restore 112<br>(Database instance)<br>Backup restore 114<br>(Database Instance)<br>Backup restore 116<br>(File server instance)<br>Host: Prod_Host_1234 |
| User Jane Doe | Permissions | Service Instances:<br>Backup restore 112<br>(Database instance)<br>Backup restore 114<br>(Database Instance)<br>Host:<br>Prod_Host_1234<br>Prod_Host_1000 |
| User Peter Doe | Permission | Service Instances:<br>Backup restore 112<br>(Database instance)<br>Backup restore 116<br>(File server instance)<br>Host: Prod_Host_1234 |

In the example above, only users John Doe, Jane Doe and Peter Doe may initiate a restore testing request. Otherwise, request validator module 106 rejects the request and returns a "denied" API response. As another example, user John Doe may be authorized to provision a database instance on backup restore 112 for Host Prod_Host_1234. As such, request validator module 106 returns an "allowed" API response and so forth. Auditable approvals that authorize the restore and testing of the specified backup data are obtained before the process can proceed to subsequent steps.

Once the restore test request is validated, restore testing can proceed. Specifically, the frontend system sends the restore test request to the relevant backup restore 112, 114 and/or 116. If the backup restore testing request is for database data (e.g. Oracle, MS SQL Server, Cassandra, etc.), the restore testing request is sent to backup restore 112. Backup restore 112 then generates a database instance that restores the database data (e.g., from a storage node 111 of FIG. 1).

If the restore testing request is for SQL Server data, for example, the restore testing request is sent to backup restore 114. Backup restore 114 then generates a SQL server database instance that restores the data (e.g., from a storage node 113). If the restore testing request is for FS RaaS Linux data, the restore testing request is sent to backup restore 116. Backup restore 116 generates a file system instance to restore the file system (e.g., from a storage node 117). So, each of the backup restores 112, 114, 116 is self-contained and modular. It is noted that the backup restores 112, 114, 116 may manage plural hosts, so the instance itself may be provisioned on an appropriate host on which the data backup was performed.

As part of the provisioning process, the backup restores 112, 114, 116 are to lockdown access to the system to ensure that the restored backup cannot be accessed while the data is being tested. Lockdown may include removing unnecessary applications, locking unnecessary ports and services, tightly controlling any external storage devices that can connect to the host and disabling unneeded accounts on the system.

As further described with reference to FIG. 2 below, in one example, the restored backup is production data to be safeguarded. If there are additional backup restores, the restored backup data is deleted, and the next backup data is restored until completion of the process. Thereafter, the instance may be decommissioned.

After the lock down and the data restore occur, restore validators 120, 126, 128 validate the integrity of the restored backup relative to production data from which the backup is created. There is the integrity of the backup itself. The restore fails if the backup is bad. After the restore, restore validators 120, 126, 128 validate that the backup is complete. That is, whether the restore includes all the necessary files to enable the application to get back up and running after a restore. Additional techniques for data integrity validation may be employed as discussed with reference to FIG. 2.

Upon completion of one or more restore tests, the backup restores 112, 114, 116 may maintain instances, in respective restore pools 118, 124, 127 that may be maintained and provisioned based upon anticipated restore requests. Once an instance is no longer needed, that instance is decommissioned as shown. In this manner, the demand and resources of the backup restore module infrastructure are aligned to optimize efficiency of the system. Instances that consume considerable resources need not be maintained for long durations and can be decommissioned as proves necessary.

Referring now to FIG. 1, the results of the restore tests may be stored in a results database 122, 125, 130 for future access (by auditors for example). The test results may also be sent to a test adjudication module 103 and corresponding results stored in an adjudicated results database 101. The test adjudication module 103 may provide an auditable evidence chain of tests that have been performed as well as indication that the application owners have acknowledged that the restore tests were successful.

Figure 2:
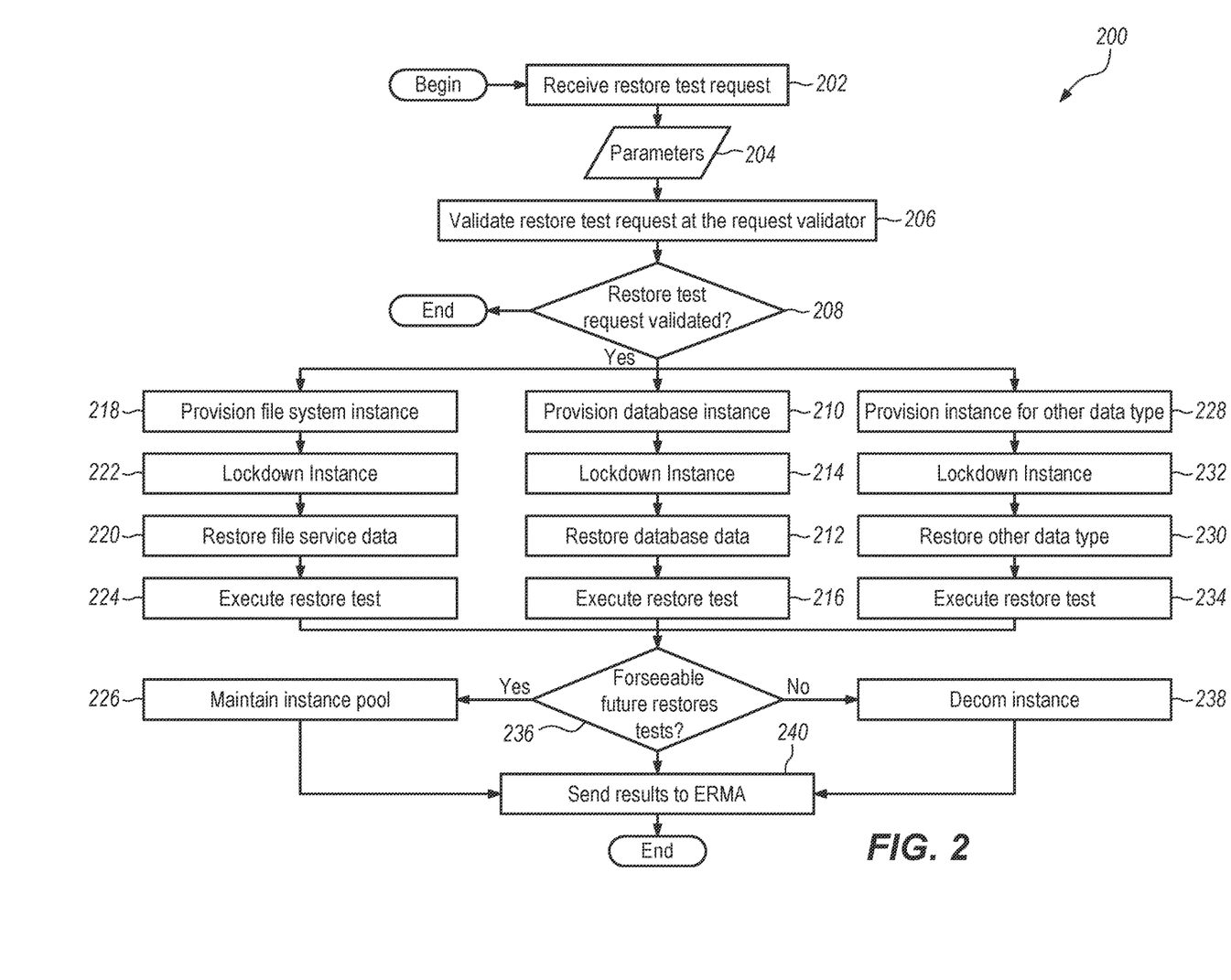
FIG. 2 illustrates a method for executing restore testing in accordance with an example of the present disclosure.

FIG. 2 illustrates a method 200 for restoring and testing backups according to an example of the present disclosure.

In FIG. 2, at block 202, method 200 is initiated by receiving a restore test request from user 102 at the RT Portal 104 of FIG. 1. As previously noted, user 102 can be ab internal user such as from a LOB (Line of Business) of a large financial entity. The request itself can be initiated with the user interface 300 (FIG. 3) of RT Portal 104.

Figure 3:
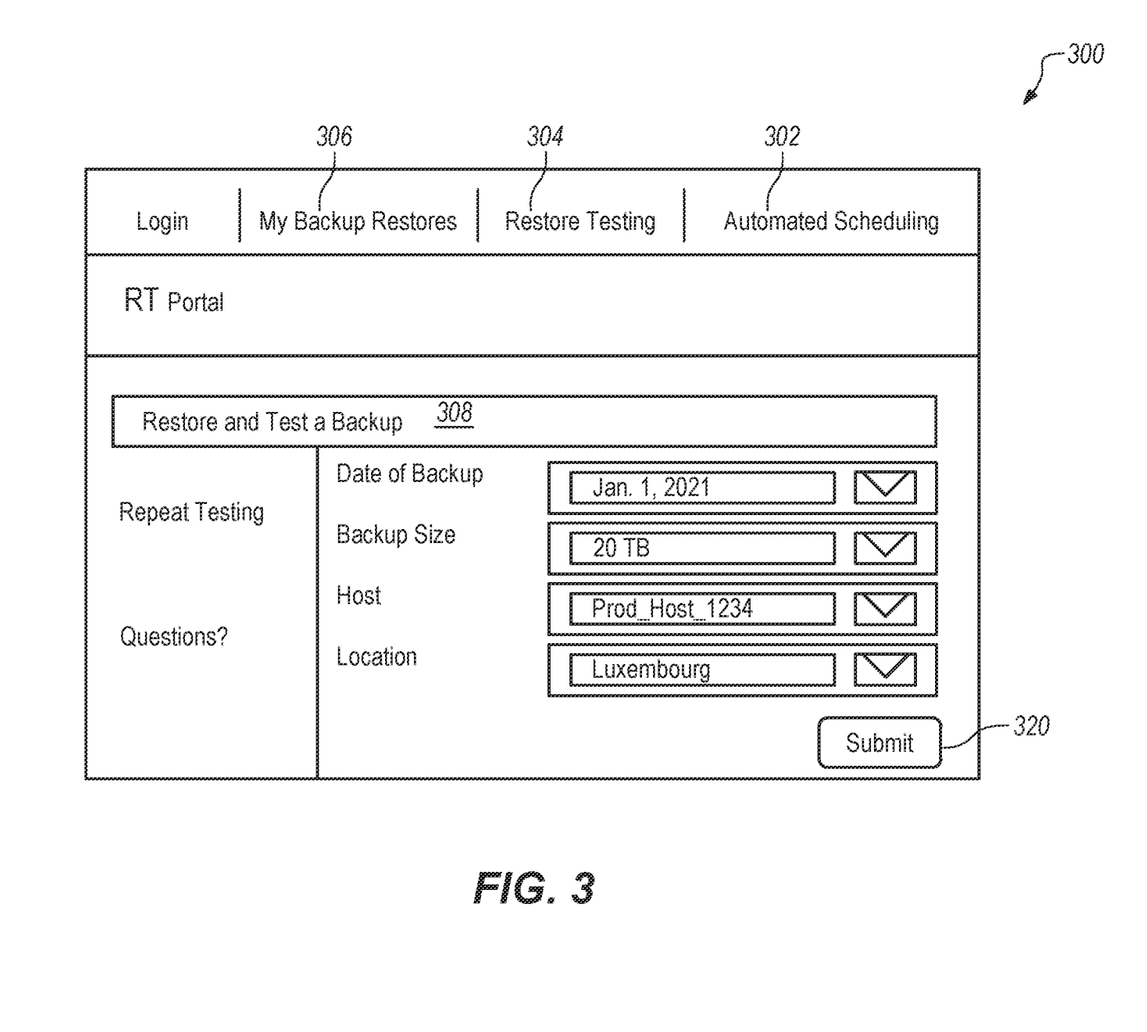
FIG. 3 illustrates an example of an RT Portal user interface for initiating the restore test request of FIG. 3.

Referring to FIG. 3, user interface 300 may be a web-based portal that is based on languages such as PHP, XML, JavaScript or JSON, for example. As shown in FIG. 3, the user may select Restore Testing 304 to execute a single restore test request of one or more database backup. In one example, the user may also select My Backup Restores 306 to view prior restores/restore tests that were performed and the corresponding results.

In another example, the user may select Automated Scheduling 302 to perform automated scheduling that allows restore tests to be executed at predetermined intervals. As an example, the user can specify that a particular restore test be carried out every six months.

Not only can the present disclosure execute single restore testing requests, the present disclosure permits automated scheduling of restore testing. This automated scheduling feature is efficient, simpler and can save system users time and effort. Users need not interact with the system every month, every quarter or yearly, etc., in order to request restore testing. Note that the RT system 100 (FIG. 1) may manage the scheduling feature. The RT system 100 coalesces some number of tests for a specific product/backup type in a specific location to optimize the use of resources required to perform all of the tests. The RT system 100 may then provision an instance, run all the tests required and then decommission the instance as necessary.

Users can schedule predetermined intervals for the system to execute restore testing all without further interaction from the users. Automated scheduling also allows restore tests to be coalesced in specific locations in order to optimize the cost of the infrastructure to perform all of the restore test requests. In the case of a cloud service for example, once request validator module 106 validates a user, the user need not interact with the control panel of the cloud service to provision and decommission instances. The RT system 100 automatically sets up restore testing and initiates and decommissions instances as necessary to effectuate the restore testing.

Referring to FIG. 2, at block 202, user 102 can select Restore and Test a Backup 308 of the user interface 300 to execute a single restore test request.

At block 204, user 102 can enter the parameters associated with the restore testing request. Examples of such parameters may be the Date of Backup and the Backup Size shown in FIG. 3. Other suitable parameters may also be specified. For example, the Host on which the data was backed up may be specified. The Location that the test is to be executed may also be specified.

In this manner, the RT Portal 104 of the present disclosure ensures that tests are executed in appropriate locations to ensure compliance with applicable controls including GDPR and data sovereignty requirements. The RT Portal 104 is to manage the pool size and locations. Acceptable locations may be passed to the appropriate restore in priority order. Upon selection of the requisite parameters, the user can then select the Submit button 320 (FIG. 3) to proceed to the next step.

At block 206 of FIG. 2, validation of the restore testing request is initiated after the user selects the Submit button 320. In one example, the RT Portal 104 user interface initiates an API call to request validation and authorization of the restore testing request from the request validator module 106. An example of the validation request may include a JSON object that includes a function call POST command. In an example, the frontend system may also generate a validation token that may be passed to the request validator module 106 to authenticate the request.

In one example, both the application owner and information owner of the production data to be restored are designated to approve and authorize the restore test request. Here, production data may include PII (Personal Identifiable Information) such as names, Social Security numbers, account numbers and other such sensitive data. Because of the sensitive nature of production data, regulators often mandate that the information be protected. As a result, the restore testing approval process of the present disclosure can protect production data by ensuring that the application or information owner is aware that restore testing is occurring. In one implementation, the request validator module 106 validates the restore testing request based on a permission list as discussed with reference to FIG. 1. If the restore testing request is for an international backup, the request validator module 106 can validate that the restore is occurring where the international data backup is located. In this manner, compliance with GDPR and data sovereignty requirements are maintained.

Referring now to FIG. 2, at decision box 208, if restore testing request is disapproved, the process is terminated. Results of the process may then be recorded in a log file or the like for future reference. If the process is approved, method 200 proceeds to block 210, 218 or 228.

At block 210, if the restore test request is directed to database data, backup restore 112 may provision a database instance on the host on which the backup was performed. The provisioned instance may be size-dependent and location-dependent. As an example, if the restore test request is for an Oracle database that is in Luxembourg, no restore of backup data can occur outside of Luxembourg. Backup restore 112 may determine if a system exists in Luxembourg. If no system exists, then backup restore 112 creates an instance with the proper size based on specified backup data.

At block 212, after an instance is provisioned, the backup restore 112 may lockdown access to the system to ensure that the restored data cannot be accessed while the data is being tested. For example, lockdown may occur by setting a limited security group that can access the instance or disabling all access (other than necessary traffic) to the host.

At block 214, the database backup is restored. Backup restore 112 may restore the user specified database backup data. The restored backup (and instance) would correspond to the largest requested backup data that is requested for restore and testing. For example, if 20 Oracle backups are to be restored, all in Luxembourg, and the largest one is 10 terabytes, then the largest instance would be 10 terabytes, and restore each backup in sequence, destroying the data in between test. Once all of the 20 backups are restored, the instance is decommissioned.

In one example, as previously noted, the restored backup data may be production data including PII such as names, Social Security numbers, account number information and other such sensitive data. As such, the instance may be locked down and the backup data restored.

At block 216, the restore test is then executed by the restore validator 120 (FIG. 1) to determine the integrity and completeness of the data restore. If the data restore is successful to begin with, then that success validates the integrity of the data. A condition of database restore success is to recover all of the data. If the backup data is corrupt, then data restore would not be possible. Other methods for validating the integrity and completeness of the data may be employed. For example, because the production data itself cannot be examined, metadata about the production data may be collected. For database data, examples of the metadata may be the types of database tables, the size of the tables, rows, etc.

Other metadata examples may be employed. For example, column type information may be collected. As another example, result sets information may be collected. Further yet, as another example, stored procedure information may be collected. All of the metadata and the original backup information can then be compared to validate the integrity and completeness of the restore.

As another example, in the case of the file system restore, the restore validator 120 (FIG. 1) executes a checksum that compares the hash values of the restored data files and the current production system files to determine the integrity of the data. For example, if the restored data files contain the ASCII text: "Name: John Doe; Address: 123 Main St, San Francisco, CA; Social Security: 12345678," then the CRC-16 cryptographic hash value of the ASCII text is DB 17. The cryptographic hash value of the production system files must be DB 17 in order to validate the integrity of the restored data files and the current production data.

Again, it is noted that this avoids examining the actual data content because production data may be sensitive and protected data. The checksum thus ensures that the restored data and the production data are consistent. It is noted that although slight variations may exist between the restored data and current production data, any such variation may be attributable to the time when the actual restore test was done because the production data may have changed after the backup data was taken. A threshold may be set to determine the acceptable level of difference.

In another example of the present disclosure, the restore validator 120 may utilize a checksum in the LOB production environment. The results of the checksum are placed in the same file system that is being backed up by the LOB. After the restore is done, a checksum is executed on the restored files, and the checksum results are placed in the same file system where the backup files are restored. Another checksum can then be executed to compare the production data checksum results with the restored data checksum results, both of which now reside on the file system where the backup files are restored. Here, it is noted that in one implementation, the restore validator 120 may be a microservice.

Referring now to FIG. 2, at block 218, the restore test request is for a file system, thus backup restore 116 (FIG. 1) may similarly provision a file system instance corresponding to the requested backup. At block 220, the file system instance is locked down, at block 222, the file system data is restored, and at block 224, the restore validator 128 validates the integrity of the restored file system, as similarly described with reference to blocks 210 through 216 above.

Referring now to FIG. 2, at block 228, the restore test request is for other data types, thus backup restore N (FIG. 1) may similarly provision an instance for the requested other data type. At block 230, the other data type instance is locked down, at block 232, the other data type is restored and at block 234, the integrity of the restored other data type is validated by executing the restore test, as similarly described with reference to blocks 210 through 216 above.

At decision block 236, method 200 determines whether it is foreseeable that future restores or restore test requests would be done. If so, at block 226, the instance is maintained as part of an instance or restore pool. If a current instance within the restore pool is sufficient for a restore request, a new instance need not be generated. Therefore, the present disclosure is efficient and can maintain an instance pool to avoid the provisioning of new instances, which can be more costly.

At decision block 236, if there are no foreseeable restore test requests, the instance is decommissioned at block 238, and the results of the restore test are sent to the test adjudication module 103 for adjudication and record keeping at block 240.

Figure 4:
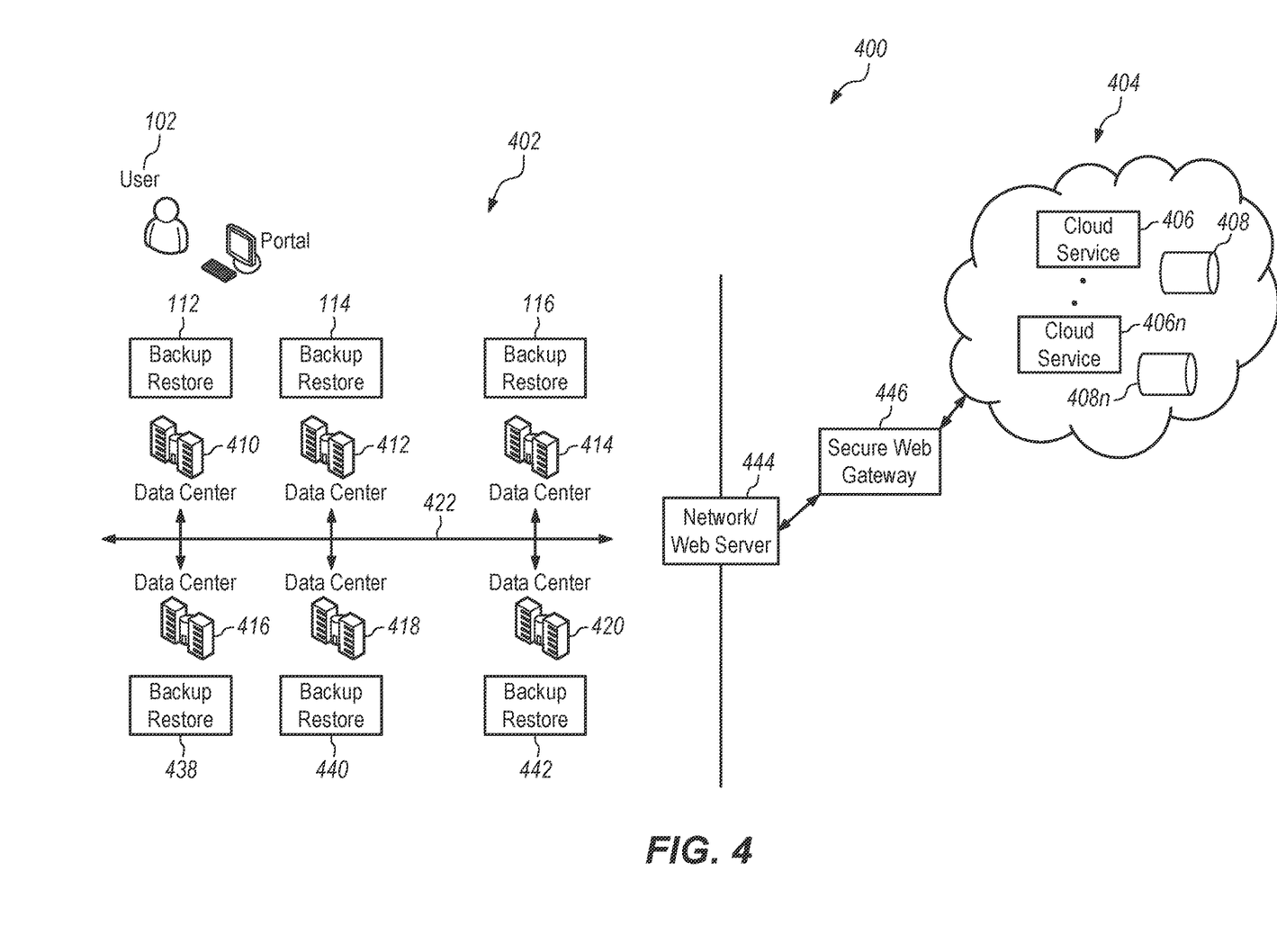
FIG. 4 is an example enterprise data network in which an example of the present disclosure can be implemented.

FIG. 4 is an example computer communication system 400 in which an example of the present disclosure can be implemented.

In FIG. 4, computer communication system 400 may include an enterprise data network (on premises) 402 communicably and securely coupled via a network/web server 444 and a secure web gateway 446 to the cloud 404. The cloud 404 may include many cloud services 406 through 406n with corresponding respective databases 408 through 408n.

As shown, the enterprise data network 402 may also include many data centers 410, 412, 414, 416, 418, 420 that are communicably coupled via, for example, a virtual private network (VPN) 422. Each data center 410, 412, 414, 416, 410, 420 may be associated with a respective backup restore 112, 114, 116, 438, 440, 442. Although not shown, each data center 410, 412, 414, 416, 418, 420 can also be associated with multiple backup restores 112, 114, 116, 438, 440, 442 and vice versa. As an example, backup restore 112 may be associated with data centers 410, 412, 414 and 416.

The data centers 410, 412, 414, 416, 418, 420 are geographically dispersed in the United States as well as globally. The data centers 410, 412, 414, 416, 418, 420 have databases that may store production data. Because of the highly sensitive nature of production data, regulators require that such production data be stored on premises. For example, the enterprise data network 402 stores production data on premises but is securely connected to the cloud via network/web server 444 and secure web gateway 446 that secures the on-premises network. The secure web gateway 446 may be connected to one or more cloud services including cloud service 406 to 406n.

Figure 5:
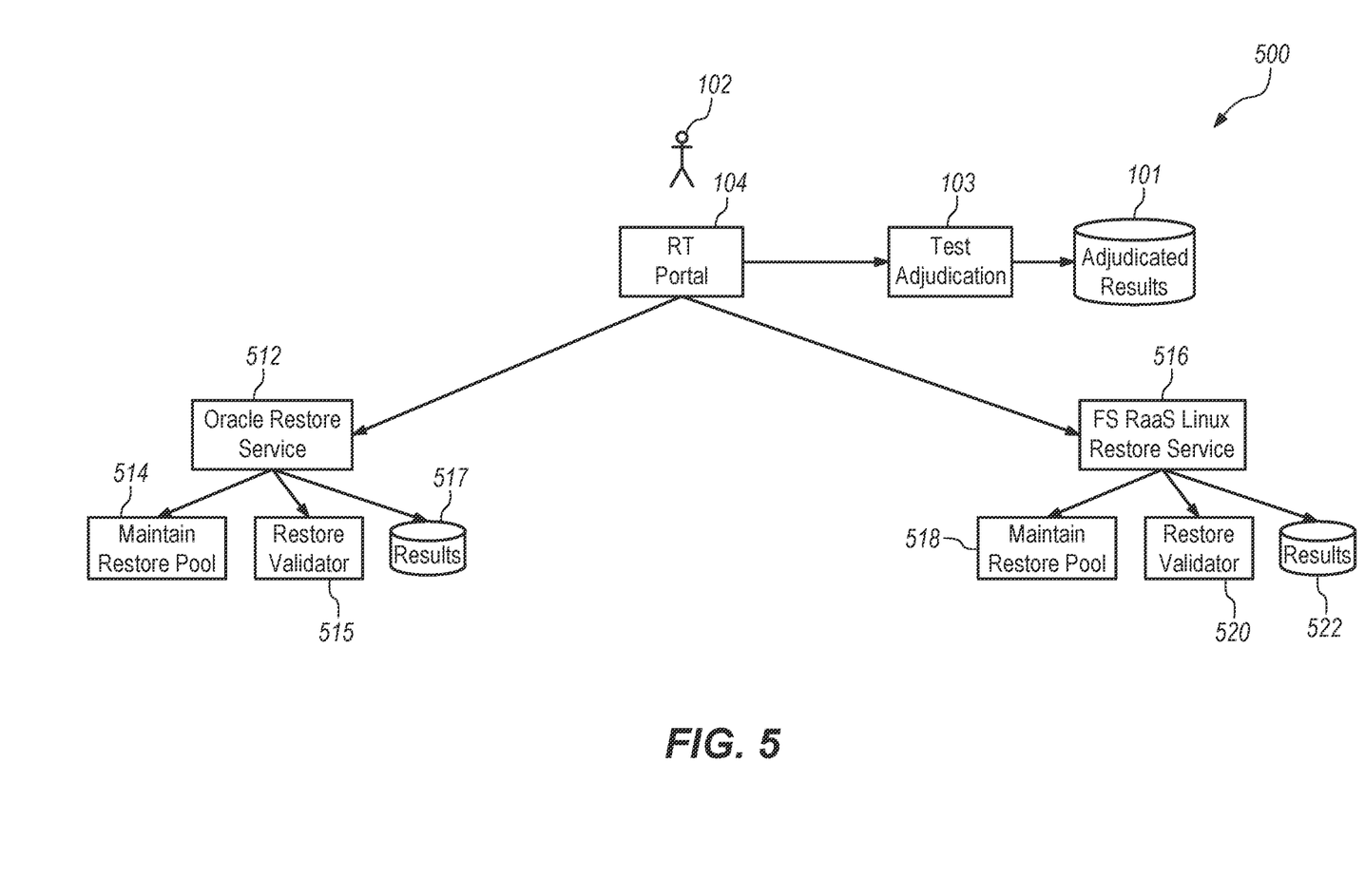
FIG. 5 is an RT system according to an example of the present disclosure.

FIG. 5 is an RT system 500 according to an example of the present disclosure.

In FIG. 5, the RTS system 500 has two backup restore modules namely, the Oracle Restore Service 512 and the FS RaaS Linux Restore Service 516. And, unlike the system of FIG. 1, the RT system 500 has no request validator module 106.

Here, the Oracle restore service 512 includes a maintain restore pool module 514 for maintaining provisioned instances. The Oracle Restore Service 512 may also include a restore validator module 515 and a results database 517 to store restore test results.

The FS RaaS Linux restore service 516 is a file system backup restore service. The FS RaaS Linux restore service 516 includes a maintain restore pool module 518 for maintaining provisioned instances for file system data. The FS RaaS Linux restore service 516 may also include a restore validator module 520 and a results database 522 to store restore test results.

Figure 6A:
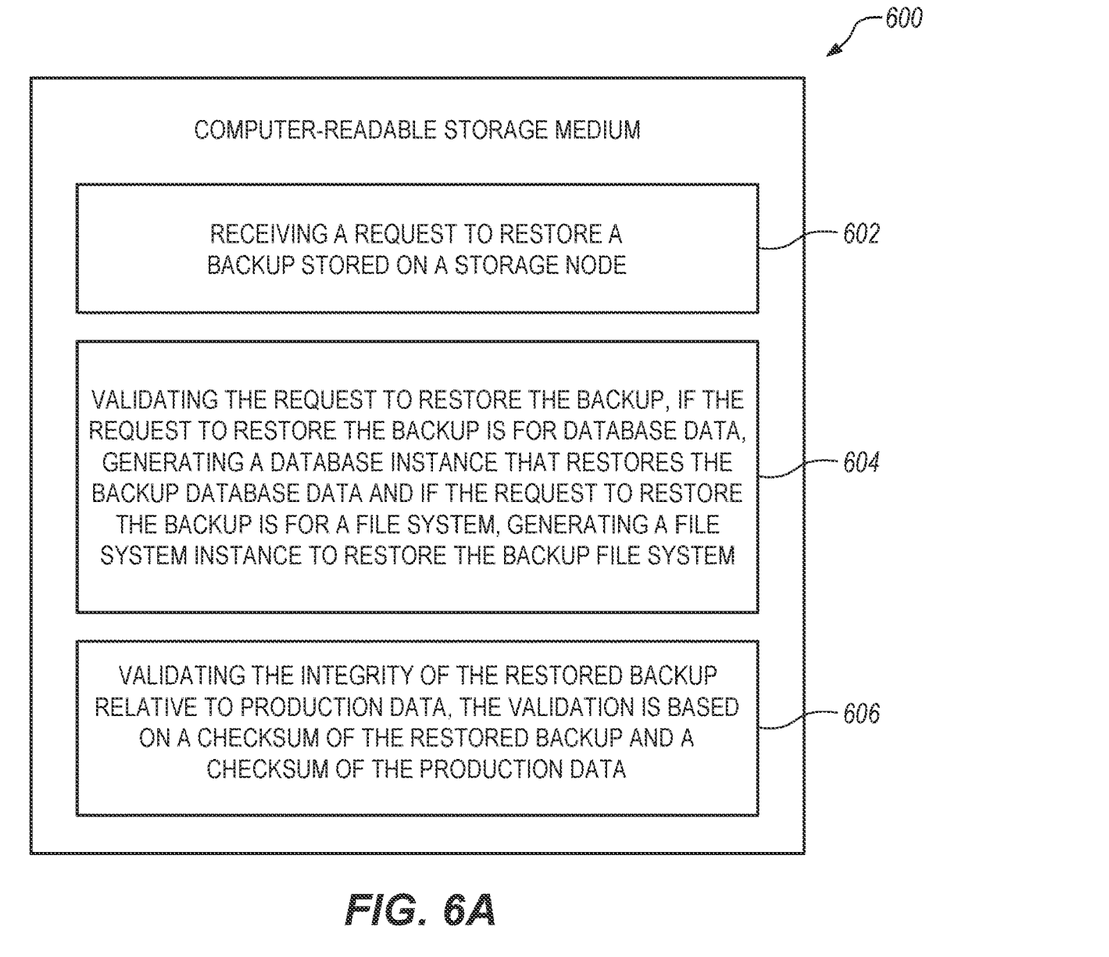
FIG. 6A illustrates example instructions stored on a non-transitory computer-readable storage medium for data restore testing according to an example of the present disclosure.
Figure 6B:
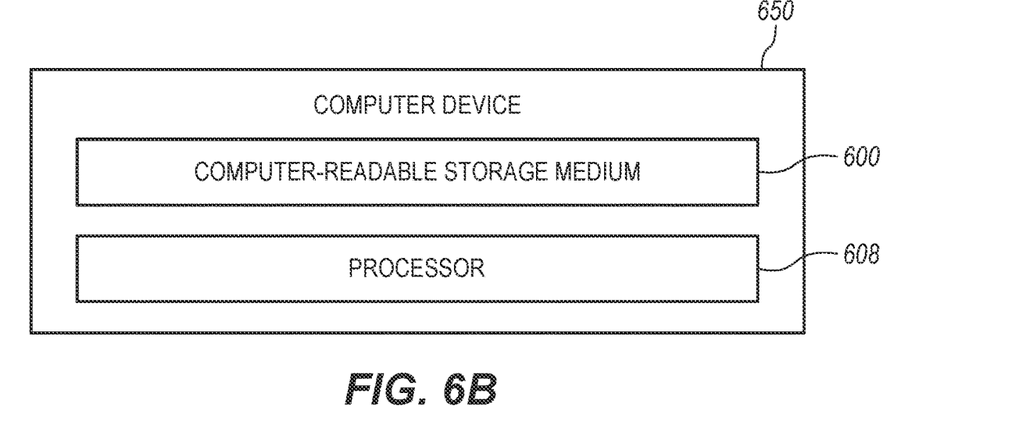
FIG. 6B illustrates an example computing device according to an example of the present disclosure.

FIG. 6A illustrates example instructions stored on a non-transitory computer-readable storage medium 600 for data restore testing according to the present disclosure, and FIG. 6B illustrates an example computing device 650 according to the present disclosure.

As shown in FIG. 6A, the non-transitory computer-readable storage medium 600 includes instruction 602, instruction 604 and instruction 606. Instruction 602 may cause a processor 608 to receive a request to restore a backup stored on a storage node 111, 113 and/or 116 of FIG. 1 (for example).

Instruction 604 may validate the request to restore the backup. If the restore request is to restore database data, generating a database instance that restores the backup database data and if the request to restore the backup is for a file system, generating a file system instance to restore the backup file system.

Instruction 606 validates the integrity of the restored backup relative to production data. The validation is based on a checksum of the restored backup and a checksum of the production data.

Although not shown, the computer-readable medium 600 may also have instructions to store the checksum of the production data and the checksum of the backup reside on the storage node, instructions to validate the integrity of the restored backup based on backup metadata and production data metadata; and instructions to determine whether the request to restore the backup is compliant with regulations.

The non-transitory computer-readable storage medium 600 may be any electronic, magnetic, optical, or other physical storage device that stores executable instructions. For example, the non-transitory computer-readable storage medium 600 may be random access memory (RAM), an electrically-erasable programmable read-only memory (EEPROM), a storage drive, an optical disc, or the like. The non-transitory computer-readable storage medium 600 can be encoded to store executable instructions that cause the processor 608 to perform operations according to examples of the disclosure.

The present disclosure may employ a software stack to enlist the underlying tools, frameworks, and libraries used to build and run example applications of the present disclosure. Such a software stack may include PHP, React, Cassandra, Hadoop, Swift, etc. The software stack may include both frontend and backend technologies including programming languages, web frameworks servers, and operating systems. The frontend may include JavaScript, HTML, CSS, and UI frameworks and libraries. In one example, a MEAN (MongoDB, Express.js, AngularJS, and Node.js) stack may be employed. In another example, a LAMP (Linux, Apache, MySQL, and PHP) stack may be utilized.

While particular examples have been described, various modifications, changes and substitutions are intended in the foregoing disclosures, and it will be appreciated that in some instances some features of particular examples will be employed without a corresponding use of other features without departing from the scope and spirit as set forth. Therefore, many modifications may be made to adapt a particular situation or material to the essential scope and spirit.

Any suitable programming language can be used to implement the routines of particular examples including C, C++, Java, JavaScript, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the above is a complete description of specific examples of the disclosure, additional examples are also possible. Thus, the above description should not be taken as limiting the scope of the disclosure, which is defined by the appended claims along with their full scope of equivalents.

The invention claimed is:

1. A system for data restore testing, the system comprising:
   at least one processor;
   a portal that receives a request to restore a stored backup of production data and directs, via an API call, the request to the at least one processor, wherein the at least one processor validates the request to restore the stored backup;
   wherein the at least one processor interfaces with the portal, and wherein if the request to restore the stored backup is for database data, the at least one processor generates a database instance that restores the stored backup database data and if the request to restore the stored backup is for a file system, the at least one processor generates a file system instance to restore the stored backup file system;
   wherein the at least one processor validates an integrity of a restored backup of the backup database data or of the backup file system relative to production data from which the backup is generated; and
   a restore pool that maintains instances that are provisioned based on anticipated requests to restore the backup.

2. The system of claim 1, wherein the at least one processor generates a checksum of the restored backup.

3. The system of claim 2, wherein the at least one processor generates a checksum of the production data.

4. The system of claim 3, wherein the at least one processor validates the integrity of the restored backup based on the checksum of the restored backup and the checksum of the production data.

5. The system of claim 3, wherein the checksum of the production data and the checksum for the stored backup reside on a same storage node.

6. The system of claim 1, wherein the at least one processor validates the integrity of the restored backup based on metadata of the restored backup and metadata of production data.

7. The system of claim 1, wherein the at least one processor locks down access to the backup during data restore testing.

8. The system of claim 1, further comprising controlling access to the backup during data restore testing so that at least one of an application, port, or external storage device is prevented from accessing the backup.

9. A non-transitory computer-readable storage medium with program instructions stored thereon, the program instructions when executed by one or more processors are operable to cause the one or more processors to perform operations comprising:
   receiving a request to restore a backup stored on a storage node;
   validating the request to restore the backup, wherein if the request to restore the backup is for database data, generating a database instance that restores the backup database data and if the request to restore the backup is for a file system, generating a file system instance to restore the backup file system;
   validating an integrity of the restored backup relative to production data, wherein the validation is based on a checksum of the restored backup and a checksum of the production data; and
   maintaining a restore pool of instances that are provisioned based on anticipated requests to restore the backup.

10. The computer-readable storage medium of claim 9, wherein the checksum of the production data and the checksum of the backup both reside on the storage node.

11. The computer-readable storage medium of claim 9, wherein the operations further comprise validating the integrity of the restored backup based on backup metadata and production data metadata.

12. The computer-readable storage medium of claim 9, wherein the operations further comprise determining whether the request to restore the backup is compliant with regulations.

13. The computer-readable storage medium of claim 9, wherein the operations further comprise controlling access to the backup during data restore testing so that at least one of an application, port, or external storage device is prevented from accessing the backup.

14. A method of data restore testing, the method comprising:
   determining whether to authorize a request to restore a backup of production data, wherein if the request to restore the backup is for database data,
   generating a database instance that restores the backup database data and if the request to restore the backup is for a file system, generating a file system instance to restore the backup file system;
   validating an integrity of the restored backup relative to production data, wherein the validation is based on a checksum of the restored backup and a checksum of the production data; and
   maintaining a restore pool of instances that are provisioned based on anticipated requests to restore the backup.

15. The method of claim 14, wherein the checksum of the production data and the checksum of the backup both reside on a storage node.

16. The method of claim 14, further comprising validating the integrity of the restored backup based on backup metadata and production data metadata.

17. The method of claim 14, further comprising locking down access to the backup prior to data restore.

18. The method of claim 14, further comprising providing a single portal UI (User Interface) that automates restore testing at predetermined intervals.

19. The method of claim 14, further comprising controlling access to the backup during data restore testing so that at least one of an application, port, or external storage device is prevented from accessing the backup.

* * * * *